United States Patent Office 3,318,742
Patented May 9, 1967

3,318,742
PROCESS FOR SLIP-PROOFING GLAZED CERAMIC SURFACES
Jack Holton Whiteside, Plaquemine, Iberville Parish, La., assignor to Slip Pruf Service Corporation, Baton Rouge, La., a corporation of Louisiana
No Drawing. Filed June 22, 1964, Ser. No. 377,078
7 Claims. (Cl. 156—2)

This invention relates to a process for treating surfaces which become slippery when wet with water. More particularly this invention relates to a process whereby the slip or skid resistance of vitreous ceramic decorative surfaces is increased, and is a companion of that in copending application Ser. No. 377,062, filed June 22, 1964.

Modern enameled or porcelain fixtures employed in sanitary ware such as bathtubs, shower stalls and flooring surfaces are normally manufactured from glazed enamel or porcelain overlaid on a metal or ceramic base. In the glazing process an extremely smooth surface is achieved which creates a hazardous condition when such surface is wet. The advantage of providing a smooth glazed surface resides in providing a surface which is readily maintained in a sanitary condition and at the same time has a high decorative value. Many attempts have been made to alleviate the hazardous condition created on such surfaces when they are wet by providing rubber or plastic mats for use on the surface thereof, lightly grinding the surfaces to a rough texture or by applying a more or less permanent coating of a different, rough material such as adhesive tapes having impregnated therein fine abrasives. None of these remedies is entirely satisfactory since the two primary requirements met by the glazed surface are eliminated, that is providing a sanitary as well as decorative surface. Furthermore, such treatments are normally not permanent.

A further type of flooring tile comprises a vitrified body of feldspar, clay or flint or mixture thereof. Flooring tiles made from such materials are normally shaped and then fired, whereby the particles are partially fused and vitrified, particularly the surface portion thereof. For the purpose of this invention, therefore, such materials can be classified as vitreous surfaces. A variety of such tiles are in wide usage and are characterized by having a smooth, relatively non-porous surface and this surface is highly prized for its decorative value as well as its wear resistance. Such materials, frequently referred to as quarry tile, also suffer from the disadvantage of being hazardously slippery when wet. Since these materials are widely used in areas of pedestrian traffic both public and private, it is desirable to provide a means for rendering such materials safe when wet. However, any such treatment must achieve this effect without noticeably changing the visual appearance of the surface.

For the purposes of this description the terms enamel and porcelain are defined as comprising a hard, smooth ceramic coating on a metal, such as cast iron, or ceramic base, provided for the purposes of decoration as well as corrosive resistance. Such a surface is normally produced by applying a porcelain or other ceramic material to such base and subjecting the finished article to a high temperature to melt or fuse the coating and thus form a continuous film. Similarly the term glaze is defined as a vitreous coating on finished pottery, porcelain, metal or enamel ware and consists of such materials as mixtures of common salt, feldspar, native silicates, kaolin, flint, sand cullet, chalk, borax, soda and the like. Such materials are frequently applied in combination with, or as, a frit. In common usage the term vitreous enamel is often specifically applied to an enamel fused on a metal surface, while the term porcelain is employed to describe ceramic ware such as floor tiles made largely of baked clay or kaolin, coated or glazed with a fusible substance. Thus the use of the term vitreous implies a glaze-like luster and such articles are characterized by their extreme smoothness and freedom from pores, which enhances their appearance and their easy maintenance in a sanitary condition. It is these desirable properties which the process of this invention maintains, in contrast to prior attempts to render such surfaces safe with respect to their slipperiness when wet. In general, the process of this invention provides means for rendering vitreous ceramic surfaces, which normally tend to be slippery when wet, resistant to slipping, such surfaces being selected from the group consisting of vitreous enamel and vitreous porcelain, wherein said surfaces are overlaid on ceramic or iron bases, and vitrified ceramic surfaces, wherein said surfaces are an integral part of the ceramic base.

It is, therefore, an object of this invention to provide a process for treating vitreous ceramic surfaces to increase the slip resistance thereof when such surfaces are wet with water or oily liquids. In particular, it is an object of this invention to provide a process for treating such surfaces without at the same time changing the visual appearance of the surface. It is a further object of this invention to provide glazed porcelain and enamel surfaces which are resistant to slipping when wet, which retain this property in normal use, and which may be repeatedly cleaned without destroying this property, at the same time leaving the initial smooth glazed surface unchanged in appearance, either wet or dry.

The above and other objects of this invention are accomplished by applying under carefully controlled conditions to the defined surfaces, an aqueous solution of a water-soluble acid fluoride, having between about 0.1 and 200 parts of fluoride ion per 1000 parts of water, leaving the solution in contact with the surface thereof for periods of time ranging from three seconds to sixty minutes, depending upon the concentration of the solution and the nature and condition of the surface being treated, and removing said solution by washing, neutralizing and combinations thereof, before any visual change in the appearance of the surface has occurred. It is a feature of this invention that the surface to be treated should be clean and free from oils, greases, detergent films and the like. The method of application is not critical and can be by spraying, brushing, pouring or sponging the surface, so long as a uniform application is obtained and the time between application and removal is controlled to achieve the desired increase in slip resistance without visibly changing the appearance.

Water-soluble inorganic acid fluorides are in general suitable for the process of this invention. One of the preferred solutions for treating vitreous enamel or porcelain surfaces comprises aqueous hydrofluoric acid having between about 0.01 and 10 weight percent acid expressed as fluoride ion. Likewise, the alkali bifluorides, such as sodium bifluoride, potassium bifluoride, lithium bifluoride and ammonium bifluoride, are satisfactory.

Suitable solutions of such bifluorides can be prepared by adding equivalent amounts of the alkali or ammonium fluoride to a hydrofluoric acid solution, thus, in effect forming solutions of the bifluorides in situ. Where such materials are available as articles of commerce, they can, of course, be directly dissolved in water in the concentrations indicated to form directly solutions for application to the surfaces to be treated. Similarly, boric acid can be dissolved in hydrofluoric acid of the required concentration to result in solutions of fluoroboric acid having the required activity and somewhat reduced volatility.

The principal advantages of employing such water-soluble fluoride salts resides in their low volatility and reduction of concurrent attack on portions of the article to be treated other than the treatment zone, that is in the vapor space above the solution. Hydrofluoric acid is, however, equally satisfactory, particularly in the lower concentration range, and can be successfully employed by taking normal precautions against vapor contact. If such vapor contact is not significant, or if conditions exist where adequate ventilation can be supplied, hydrofluoric acid is entirely satisfactory over the entire concentration range.

The following illustrates one method of determining the proper conditions of treatment to achieve the results of this invention. A solution of hydrofluoric acid of known concentration within the limits specified above is wiped as a thin film on a number of test pieces of quarry tile. At selected intervals of time, within the limits specified above, a solution of sodium carbonate is poured on each test piece followed by washing with water and drying. It is observed that those test pieces upon which the hydrofluoric acid had remained above a certain period of time will have a slightly roughened appearance and a loss of the original gloss. By this means is determined the maximum period that a solution of this concentration should remain on the surface to be treated, that is less than that required to produce a visible change. The remaining test pieces, that is those treated for less than this maximum period of time, are then wetted with water, and by applying pressure in a diagonally downward direction with the finger it will be determined that the test pieces treated for longer than a certain minimum period of time have a greatly increased resistance to slip over a similarly wetted, untreated test piece. This procedure is then repeated with other concentrations of hydrofluoric acid, or with the other acid fluoride solutions of this invention. From this can be determined the optimum concentration and type of fluoride ion and time of treatment for any such surface coming within the scope of this invention.

While the nature of the treatment is not well understood, it would appear that a subtle change in the surface occurs which is not merely an etching of discrete particles of the surface. This becomes evident when it is recognized that a highly glazed, porcelain bathtub surface can be rendered completely safe, having a high degree of resistance to slipping to the bare foot when wet, without it being in any way apparent by visual observation that the surface has been treated. The original high luster imparted by the manufacturer is retained and the feel of the surface when dry is unchanged. It is only when a film of water is in contact with the surface that the effect of the process of this invention is noted.

To further describe the use of the process of this invention, a standard bathtub which had been in service for five years and still retained its initial luster, and which became dangerously slippery when wet, was treated by applying, from a spray container to the bottom, clean surface and up to a height of four inches on the vertical surfaces therefrom, a solution of three parts of hydrofluoric acid to one hundred parts of water. This applied film was permitted to remain on the surface of the bathtub for forty-five seconds. At the end of this time it was noted that the surface being treated was no longer slippery when tested by feeling with the operator's finger. At the end of this period a solution of 5 percent soda ash was poured on the surface and directly thereafter the entire bathtub was washed thoroughly with water. Upon drying the surface, it could not be determined by visual observation where the treatment had started and where the treatment had stopped. However, upon wetting the surface, as for example by permitting water to run from a shower head into the tub, a safe non-slippery surface existed on the bottom and this effect was even apparent to a high degree when ordinary bath soap was present in this water. After this bathtub had been used in normal service, including contacts with soaps and other detergents, and after having been scrubbed with normal household abrasive cleaners, there was no impairment after twenty-four months of the effectiveness of the treatment. At the end of this period, no apparent change in the visual appearance of the treated and untreated surfaces could be distinguished.

It is important to control, or stop, the reaction creating the improved surface. With certain surfaces it is adequate to flush the acid fluoride solution with water. By this means of dilution of the active agent, or physically removing it from the site of application, the treatment can be stopped before the decorative quality of the surface is impaired. Other means of removing the acid fluoride from the surface being treated comprise chemical treatments, or neutralization of the active ingredient. In field applications, that is in treating sanitary ware already installed in homes, hotels, schools, institutions or other public places, it is desirable to provide mild, innocuous agents for this removal. Soda ash, sodium bicarbonate, aqueous ammonium hydroxide and the like mild alkaline reagents are preferred. In controlled industrial uses, such as treating bathtubs, porcelain tile, quarry tile and the like as a step in manufacture, more active agents may be safely employed, such as sodium hydroxide, calcium hydroxide and the like. Similarly, in treating quarry tile installed in walkways, as flooring in public buildings, kitchens, lavatories, and cafeterias, for example, the choice of water, mild or stringent alkaline neutralizing agents, and the strength thereof, is determined largely by the training and knowledgability of the personnel applying the treatment, and the susceptibility of surrounding material to damage from the agent employed.

One method for determining the coefficient of friction or increase in skid resistance for vitreous surfaces following treatment by this process is by use of the skid resistance tester developed by the Road Research Laboratory of the Department of Scientific and Industrial Research at Harmondsworth, Middlesex, England. This tester comprises a framework for suspending a free-swinging pendulum, having attached to the lower end thereof a rubber slider, hinged and spring-loaded, so that as the pendulum describes a downwardly descending arc, passing over and in contact with a flat surface, the rubber slider remains in contact with the surface, describing a horizontal, planar movement. Rigidly attached to the pivotal end of the pendulum arm is a pointer moving across the face of a graduated scale. Thus as the slider passes over and in contact with the test surface the pointer describes a corresponding arc in circular travel from the point of contact to the position where the slider is stopped by friction. The percentage movement of the pointer on a test piece as a function of the movement on a standard piece, is a measure of the relative skid resistance of the surface being tested. Thus, by adjustment of the pressure of the rubber slider and the arc of free-fall prior to contacting the surface, the machine can be adjusted to read 100 percent of full scale on a flat, untreated vitreous surface wetted with water. As a test of the effectiveness of the process of this invention, replacement of the untreated test piece by a treated vitreous surface similarly wetted with water and with the same machine adjustments, the pointer may describe, for example, from 5 to 15 percent of the full scale arc with test pieces treated according to the limits set forth above. Upon observing these treated pieces and the untreated piece when dry, the surfaces cannot be distinguished from one another, that is the treated pieces and the untreated test piece have the same resistance to skid when tested dry.

In addition to preventing the creation of a hazardous slippery condition on vitreous enamel or glazed porcelain surfaces when wet, minor contamination of the surface with certain oils after treatment by this process does not render the surface dangerously slippery. After wiping spills of vegetable or mineral oils from the surface with a dry cloth, the skid resistance of the treated surface is substantially the same as before the spill. Furthermore, to completely remove such spills from the surface requires no further effort than to remove similar spills from untreated surfaces, indicating that the initial smooth, glossy condition of the surface has been retained, and indicating that absorption has not increased.

The following table illustrates concentrations of the indicated acid fluoride solutions which, when applied to the surface of four inch square quarry tiles for the period of time indicated, reduce the slipping characteristic of the surface when wet by at least 40 percent.

| Material | Concentration, Weight Percent | Time of Treatment, Minutes |
| --- | --- | --- |
| Hydrofluoric Acid | 1.0 | 60 |
| Do | 3.0 | 30 |
| Do | 4.0 | 20 |
| Do | 6.0 | 15 |
| Do | 7.0 | 10 |
| Do | 10.0 | 5 |
| Lithium Bifluoride | 1.5 | 55 |
| Do | 8.0 | 12 |
| Ammonium Bifluoride | 3.0 | 40 |
| Do | 7.0 | 12 |
| Do | 10.0 | 6 |

Similarly, vitrified ceramic tile, wherein the vitrified surface is applied separately to the ceramic base, can be rendered ten fold more resistant to slipping when wet by employing the following materials at the indicated concentrations and time of application.

| Material | Concentration, Weight Percent | Time of Treatment, Minutes |
| --- | --- | --- |
| Hydrofluoric Acid | 0.01 | 60 |
| Do | 0.5 | 45 |
| Do | 1.0 | 20 |
| Do | 2.0 | 10 |
| Do | 3.0 | 5 |
| Do | 10.0 | 0.05 |
| Ammonium Bifluoride | 1.0 | 15 |
| Potassium Bifluoride | 3.0 | 7 |
| Sodium Bifluoride | 8.0 | 1 |

The foregoing description of the process of this invention is illustrative of several means of accomplishing the objects thereof. However, it is not to be construed as limiting to the scope thereof, as other embodiments and variations will be apparent to those skilled in the art. The scope and limits of this invention are to be construed, therefore, in the light of the appended claims. Thus, where the acid fluoride is available in powder form, this can be dusted on the surface followed by a water spray, resulting in solutions corresponding to the process of this invention.

I claim:

1. A process for improving the safety of bath tubs that have a glazed ceramic surface, which process comprises applying to that surface an aqueous acid fluoride in a concentration equivalent to from 0.01 to 10 weight percent hydrogen fluoride, to cause the acid fluoride to attack the surface and reduce its slipperiness, and terminating the attack before the visual appearance of the surface is significantly changed.

2. A process for improving the safety of glazed ceramic tile, which process comprises applying to the glazed surface an aqueous acid fluoride in a concentration equivalent to from 0.01 to 10 weight percent hydrogen fluoride to cause the acid fluoride to attack the surface and reduce its slipperiness, and terminating the attack before the visual appearance of the surface is significantly changed.

3. The combination of claim 1 in which the acid fluoride is hydrogen fluoride.

4. The combination of claim 1 in which the attack is terminated by neutralizing the acid fluoride.

5. The combination of claim 2 in which the acid fluoride is hydrogen fluoride.

6. The combination of claim 2 in which the attack is terminated by neutralizing the acid fluoride.

7. The combination of claim 1 in which substantially the entire upper surface of the bottom of the bath tub is subjected to the acid fluoride attack.

References Cited by the Examiner

UNITED STATES PATENTS

| 2,118,386 | 5/1938 | Swinehart | 156—24 |
| 2,652,360 | 9/1953 | Bond et al. | 156—2 |
| 2,999,013 | 9/1961 | Meth | 156—24 |

FOREIGN PATENTS 596,317  4/1960  Canada.

ALEXANDER WYMAN, *Primary Examiner.*

JACOB H. STEINBERG, *Examiner.*